Patented Feb. 28, 1928.

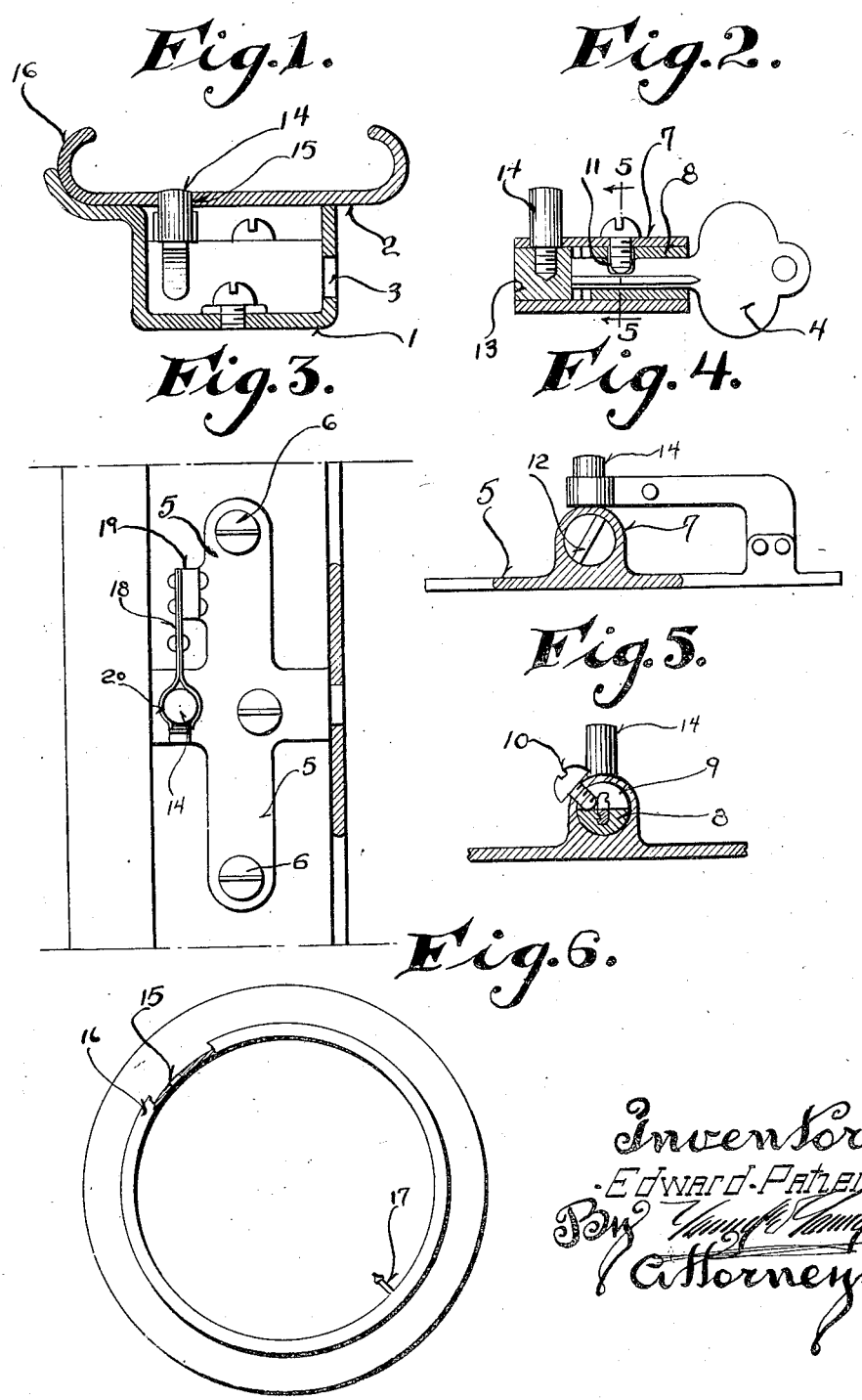

1,660,809

UNITED STATES PATENT OFFICE.

EDWARD PATZER, OF MILWAUKEE, WISCONSIN.

RIM LOCK.

Application filed July 10, 1926. Serial No. 121,684.

This invention relates to a rim lock for automobiles.

In automobiles, as heretofore constructed, it is frequently the case that a thief will remove the rim and tire as a unit, even from the wheels on which they are placed, by unscrewing the nuts. This is particularly true when the car is left on the street over night, for instance, or when the thief has a material length of time in which he may jack up the car and remove the rims and tires.

This invention is designed to prevent the theft of tires through the means described above, and objects of such invention are to provide a rim lock which will lock the rim to the felly, and which is key controlled, and may be instantly unlocked to permit the authorized removal of the rim.

An embodiment of the invention is shown in the accompanying drawings in which:

Figure 1 is a transverse sectional view through a rim and a portion of the felly, showing the lock in position;

Figure 2 is a transverse sectional view through the lock;

Figure 3 is a fragmentary plan view of a portion of the felly with the rim removed showing the parts in the position illustrated in Figure 1;

Figure 4 is a sectional view on the line 5—5 of Figure 2;

Figure 5 is a transverse sectional view through the lock;

Figure 6 is a view of the rim with the tires in position, showing the relative location of the hole engaged by the lock and of the filling nipple.

In practicing this invention, a lock is positioned within the channel of the felly 1, the felly being adapted to receive the usual rim 2. The felly is provided with an aperture 3 through which a key 4 may be inserted.

The lock comprises a base member 5 which is secured to the felly by means of a pair of screws 6. This lock is provided with a central portion 7 which has a cylindrical aperture therethrough, and which receives a tumbler or cylindrical member 8, as shown most clearly in Figure 2. Further, this tumbler is provided with a slot 9 (see Figure 5) which cooperates with a screw 10 to limit the angle through which the tumbler may be rotated by means of the key. Further, the slot prevents axial removal or displacement of the tumbler.

It is to be noted that the screw is in the way of the key, and the key may be inserted only when the tumbler is in a predetermined position. After the key has been inserted, it may be rotated to rotate the tumbler, as the key is provided with a slot 11 to pass the screw 10. The key extends through the tumbler and projects from its rear end. This projected end of the key is adapted to engage a slot 12 formed in a cylindrical member 13. This cylindrical member is, therefore, rocked by the key when the key is inserted through the tumbler and engages the slot 12. The member 13 is provided with an outwardly extending relatively heavy pin 14 which projects radially therefrom and passes through a slot formed in the portion 7 of the lock. This pin is adapted to enter a slot or notch 15 formed in the rim 16, as shown most clearly in Figures 1 and 6. Thus, when the pin 14 is in the slot 15, the rim can not be removed, as the slot 15 is located diametrically opposite the filling nipple 17.

In order to hold the pin against inadvertent displacement from locked position due to jars, a pair of spring arms 18 are carried by a lug 19 formed on the base 5 of the lock. These spring arms have reversely curved jaws 20, which grip the pin 14 and hold it in locked position.

In using the device, it is merely necessary to slip the rim in place and rotate the pin 14 into the slot or opening 15 in the rim. This securely locks the rim in place, and prevents unauthorized removal thereof. When it is desired to remove the rim, it is merely necessary to insert the key and rotate it to thus rock the pin 14 out of the slot 15, and permit the rim to be removed in the usual manner.

It will thus be seen that a rim lock has been provided which is of reliable and simple construction, and which may be readily applied to the standard forms of fellys, and which will cooperate with the standard form of rims with a minor alteration of the felly and the rim, that is to say, by merely providing the apertures 3 and 15 in these respective members.

It will be seen further that the device will not jar out of place and, consequently, may be relied upon to retain the rim in locked relation to the felly.

Although the invention has been described in considerable detail, such description is intended as illustrative rather than limiting as the invention may be variously embodied and as the scope of such invention is to be determined as claimed.

I claim:

1. The combination of a wheel felly having a channeled depression therein, a rim carried by said felly and having a notch formed therein, a lock located within the channeled depression of said felly and having a revolubly mounted tumbler, a key adapted to enter such tumbler and to project from its rear end, a member carried by said lock and mounted in axial alignment with said tumbler and adapted to receive the rear end of said key, and a pin carried by said member and projecting through said lock and adapted to be rocked into the notch formed in the rim.

2. The combination of a wheel felly having a channeled depression therein, a rim carried by said felly and having a notch formed therein, a lock located within the channeled depression of said felly and having a revolubly mounted tumbler, a key adapted to enter such tumbler and to project from its rear end, a member carried by said lock and mounted in axial alignment with said tumbler and adapted to receive the rear end of said key, a pin carried by said member and projecting through said lock and adapted to be rocked into the notch formed in the rim, and a spring for retaining said pin in locked position.

3. The combination of a wheel felly having a channeled depression therein, a rim carried by said felly and having a notch formed therein, a lock located within the channeled depression of said felly and having a revolubly mounted tumbler, a key adapted to enter such tumbler and to project from its rear end, a member carried by said lock and mounted in axial alignment with said tumbler and adapted to receive the rear end of said key, a pin carried by said member and projecting through said lock and adapted to be rocked into the notch formed in the rim, and a screw carried by said lock and projecting into a notch formed in said tumbler, said key being contoured to pass such screw when said key is rotated and when the key is properly inserted.

In testimony that I claim the foregoing I have hereunto set my hand at Milwaukee, in the county of Milwaukee and State of Wisconsin.

EDWARD PATZER.